United States Patent [19]

Boward, Jr.

[11] 4,005,015
[45] Jan. 25, 1977

[54] AERATING APPARATUS

[76] Inventor: James F. Boward, Jr., 4020 Locust Lane, Harrisburg, Pa. 17109

[22] Filed: June 5, 1975

[21] Appl. No.: 584,087

[52] U.S. Cl. .............................. 210/220; 261/121 R
[51] Int. Cl.² ......................................... B01F 3/04
[58] Field of Search ............ 210/14, 15, 63, 198 R, 210/199, 220, 221 R; 261/36 R, 121 R, DIG. 47, DIG. 70, DIG. 75

[56] References Cited

UNITED STATES PATENTS

| | | | |
|---|---|---|---|
| 1,286,775 | 12/1918 | Rein et al. ............................ | 210/63 |
| 2,126,164 | 8/1938 | Anderson ..................... | 261/36 R X |
| 2,527,097 | 10/1950 | Katow ......................... | 261/DIG. 47 |
| 3,320,928 | 5/1967 | Smith ......................... | 261/121 R X |
| 3,614,072 | 10/1971 | Brodie ............................ | 261/36 R |
| 3,785,558 | 1/1974 | Albritton et al. ............ | 261/36 R X |
| 3,829,070 | 8/1974 | Reba et al. ................... | 261/36 R X |

FOREIGN PATENTS OR APPLICATIONS

| | | | |
|---|---|---|---|
| 236,892 | 11/1964 | Austria ....................... | 261/DIG. 75 |
| 942,754 | 11/1963 | United Kingdom ........ | 261/DIG. 75 |

*Primary Examiner*—Thomas G. Wyse
*Assistant Examiner*—Robert H. Spitzer
*Attorney, Agent, or Firm*—Seidel, Gonda & Goldhammer

[57] ABSTRACT

Apparatus for aerating and/or treating shallow ponds of water includes a submersible pump having an outlet conduit extending to a support means above water level. At the support means, the outlet conduit extends downwardly and communicates with one or more distributing conduits having a greater flow capacity. Valve means is provided at said support means for introducing air and/or chemicals into the downwardly flowing stream. The distribution conduits terminate in a submersible distributor head. The entire apparatus is portable.

9 Claims, 3 Drawing Figures

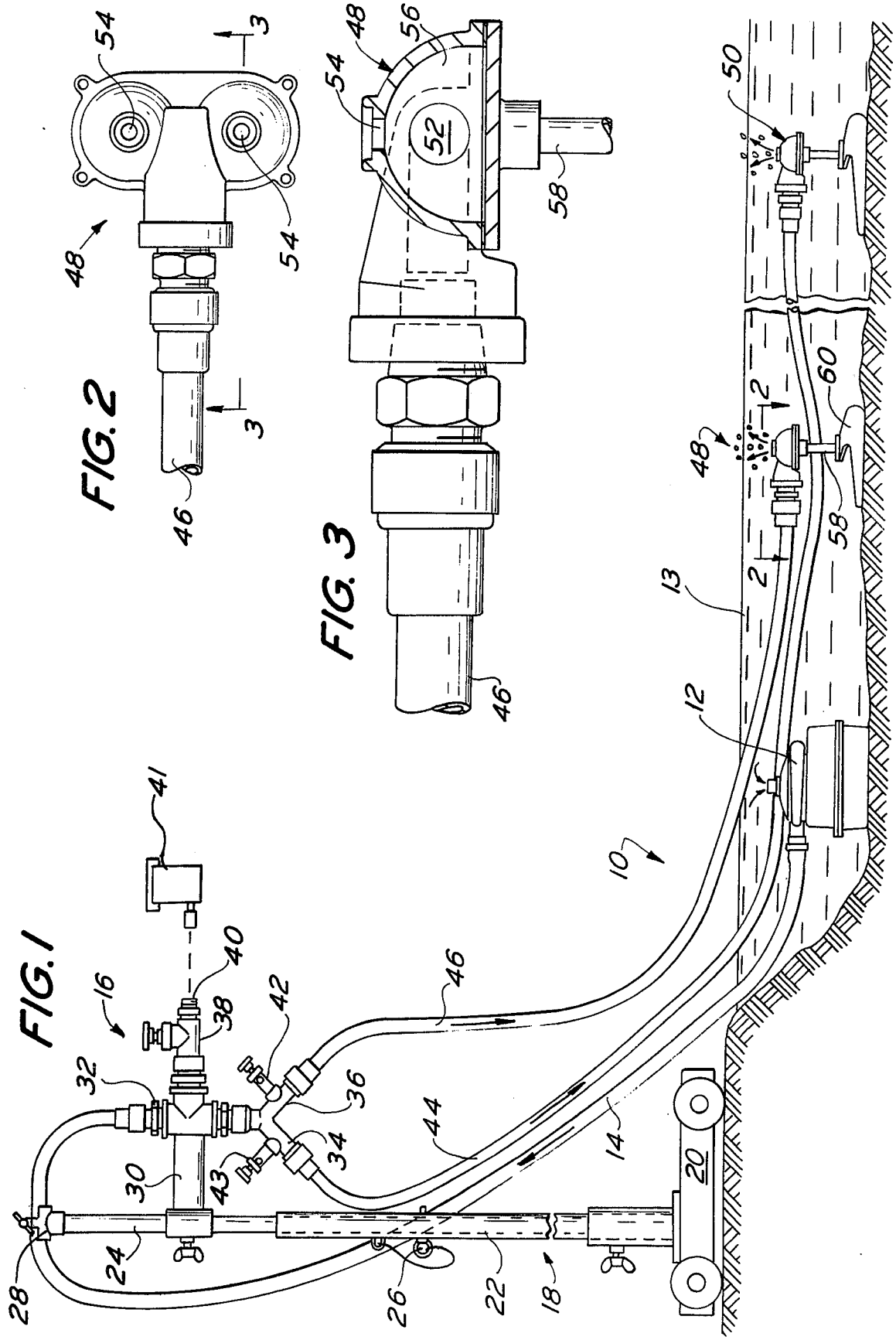

AERATING APPARATUS

BACKGROUND

Aeration of stagnant ponds of water is desirable to promote growth of fish and prevent growth of algae and/or fungus. A portable aerating apparatus has not been designed heretofore for stagnant or slow moving, shallow bodies of water.

The aerating apparatus proposed heretofore are not adapted for use in shallow bodies of water such as fish ponds. Some aerators discharge an air-water mixture downwardly into the body of water immediately adjacent the location of introduction of air into a moving water stream and hence do not promote the type of aeration needed for shallow fish ponds. For example, see U.S. Pat. No. 3,640,516. Other disadvantages of the prior art include the introduction of air into the water upstream from the pump which results in erratic discharge of an air-water mixture. Other systems proposed heretofore are not practical for use with shallow fish ponds and/or are complicated by the manner in which air is introduced at the distributor head. For example, see U.S. Pat. No. 3,271,304 wherein the aerating apparatus is particularly designed for a confined body of water.

The present invention is directed to apparatus for aerating shallow bodies of water and includes a pump having an inlet and an outlet. A first conduit has one end connected to the pump outlet and its other end is connected to a valve means for introducing air and/or chemicals into a flowing stream of water moving in a downward direction toward liquid level. A means is provided for supporting the valve means at an elevation above water level.

a distribution conduit means communicates with the first conduit downstream from the valve means and has a greater flow capacity than said first conduit for receiving water, air and/or chemicals therefrom. A submersible distributor head is connected to the distribution conduit means. The distributor head has a chamber provided with an inlet and an outlet. The chamber inlet is at an elevation below the elevation of the chamber outlet. The chamber outlet is substantially smaller in size as compared with the chamber inlet.

The apparatus of the present invention is particularly designed so as to be portable so that it may be used to aerate and/or add chemicals to shallow bodies of water. Aeration of the water has a direct effect on algae and fungus as well as a direct effect on improving the growth rate of fish. The apparatus in the present invention is simple, easy to operate, and inexpensive while being versatile in its capability of use with shallow bodies of water.

The above objects and other objects will be apparent from the disclosure set forth hereinafter.

For the purpose of illustrating the invention, there is shown in the drawings a form which is presently preferred; it being understood, however, that this invention is not limited to the precise arrangements and instrumentalities shown.

FIG. 1 is a side elevation view of the apparatus in the present invention operatively disposed in a shallow body of water.

FIG. 2 is a view taken along the line 2—2 in FIG. 1.

FIG. 3 is a sectional view taken along the line 3—3 in FIG. 2.

Referring to the drawing in detail, wherein like numerals indicate like elements, there is shown in FIG. 1 aerating apparatus in accordance with the present invention designated generally as 10.

The apparatus 10 includes a pump 12. Pump 12 is preferably a submersible pump having an inlet directly communicating with a shallow body of water 13. The pump inlet may be above or below the main body of the pump. The outlet of pump 12 is connected to one end of a conduit 14.

The conduit 14 extends upwardly from the pump 12 to an elevation above the surface level of the body of water 13 for connection to a valve means designated generally as 16. The upper end of conduit 14 and the valve means 16 are provided with a portable support structure designated generally as 18. The support structure 18 may assume a wide variety of configurations. As illustrated, the support structure 18 includes a base 20 having vertically disposed telescoping the members 22 and 24. The tube member 24 is preferably orientated with respect to the tube member 22 in an adjustable manner such as by aligning holes in the tube members and then extending a removable pin 26 through a pair of aligned holes in the tube members 22, 24.

The upper end of the tube member 24 is provided with a clamp 28 for removably clamping the upper end portion of conduit 14. Tube member 24 supports a bracket designated generally as 30. Bracket 30 is adjustably clamped to the tube member 24 by way of a set screw or the like so that the bracket 30 is preferably at an elevation of about six feet above the surface level of the body of water 13.

The bracket 30 supports the valve means 16 in a manner so that the water from conduit 14 is flowing downwardly at the location of the valve means 16. The valve means 16 includes a Y-shaped member having a vertical leg 32 and diverging legs 34, 36. Air and/or chemicals may be introduced into the vertical leg 32 by way of valve 38 having an inlet nipple 40 which is threaded. The threaded nipple 40 facilitates joining a container 41 thereto so that a suitable chemical may be metered into the downwardly flowing stream of water to ultimately treat the body of water 13 in any desired manner such as to prevent the growth of algae, fungus, etc.

A manually adjustable valve 42 is connected to the leg 36 to facilitate introduction of air thereinto. A similar manually adjustable valve 43 is connected to leg 34. Each of the valves 38, 42, and 43 may be of conventional construction and communicate with the respective leg to which they are connected in a manner whereby venturi action of the flowing stream of water sucks air and/or chemicals into the stream.

Leg 34 is connected to one end of a distribution conduit 44. Leg 36 is connected to a distribution conduit 46. The combined flow capacity of conduits 44, 46 exceeds that of conduit 14 to accommodate the air and/or chemicals introduced into the flowing stream of water. Conduits 44, 46 are also substantially longer than the length of conduit 14. For example, conduit 44 may have a length up to 50 feet depending upon the size of the pump 12. If the conduits 44, 46 are too long for the pressure generated by pump 12, the water head in the body of water 13 will flood the conduits. Satisfactory results have been attained with the conduits 44, 46 having a length of about 25 feet while using a pump 12 having an output pressure of about 20 psi.

Conduit 46 terminates in a distributor head 48. Conduit 44 terminates in a distributor head 50. The distributor heads 48 and 50 are identical. Accordingly, only distributor head 48 will be described in detail.

As shown more clearly in FIGS. 2 and 3, the distributor head 48 is a duplex head with each chamber thereof communicating with the conduit 46. Each head has its own outlet port. Only one half of the head 48 is described in detail hereinafter.

As shown in FIG. 3, one chamber of the head 48 designated 56 communicates with an inlet port 52 at its lower end and with an outlet port 54 at its upper end. Outlet port 54 is substantially smaller in cross section as compared with the inlet port 52. Inlet port 52 is substantially smaller in cross section as compared with the chamber 56. Accordingly, the air introduced by way of valve 38, 42 or 43 is compressed and intimately mixed with water in each chamber of each distributor head, such as chamber 56, before discharge vertically through an outlet port 54. The distributor 48 is mounted on a vertically adjustable post 58 extending upwardly from a base 60 which sits on the floor of the pond or body of shallow water 13.

While the support structure 18 is shown as being on land, this arrangement is for purposes of illustration only. The support structure 18 can be mounted on a raft and located in the middle of the body of water 13 when such body of water has substantial breadth. It will be noted that none of the components of the apparatus 10 are rigidly secured, anchored, or mounted in place in order that the apparatus 10 may be completely portable whereby it may by quickly moved from one spot to another. If desired, base 20 may be mounted on wheels as shown. Also, the apparatus 10 may be made inexpensively, and requires little or no maintenance.

The operation of the apparatus 10 is as follows. The pump 12 is submerged in the body of water 13 due to its own weight. Likewise, the distributor head 48 and/or 50 is submerged in the body of water with the outlet port facing upwardly. An electrical extension cord is connected to the pump 12 but is not shown. The support structure 18 is adjusted to position the valve means 16 at about six feet above the level of the body of water 13. With container 41 disconnected from the threaded nipple 40, the valves 42 and 43 may be closed and only valve 38 being open. Air introduced into the downwardly flowing stream of water at the outlet pressure of pump 12 is sucked in through valve 38 and mixes with the water as a result of the velocity head attained by gravity and the pump pressure. The mixture of air and water is distributed by the conduits 44, 46 to their respective distribution heads.

In the distribution heads, the water in the air is more thoroughly mixed with the air being compressed within the chamber 56. The distribution of aerated water from the outlet ports 54 on each of the heads produces aerated water having a fine fizz. If the inlet port 52 were substantially larger so as to approximate the size of chamber 58, the air bubbles from outlet port 54 would be large in size and the resultant aeration of the body of water 13 would be unsatisfactory.

When the container 41 is connected to the threaded nipple 40, the valves 42 and 43 are manually adjusted so as to facilitate introduction of air into the downwardly flowing stream of water mixed with a chemical from container 41.

The flow capacity may be varied as desired depending upon the size of the pump and the size of the conduits. When using conduit 14 with an ID of five-eighths of an inch, with conduit 44 having an ID of one-half inch and conduit 46 with an ID of five-eighths inches, satisfactory results have been attained with a flow rate of 6 gallons per minute. In an operative embodiment, outlet port 54 has a diameter of one-fourth to thee-eighths inches, chamber 56 has a transverse dimension of about 2–3 inches, and inlet port 52 has a diameter of about three-fourths of an inch. The apparatus 10 is particularly adapted for use in shallow bodies of water having a depth up to about 10 to 12 feet.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for aerating bodies of water comprising a pump having an inlet and one outlet, a first conduit having one end connected to said pump outlet, valve means coupled to the other end of said first conduit to allow a fluid at atmospheric pressure to be introduced into said first conduit, structure for supporting said valve means and said other end of said first conduit at an elevation above water level with said other end of said first conduit at an elevation above water level with said other end of said first conduit being directed downwardly, distribution conduit means having a greater flow capacity than said first conduit, said distribution conduit means having one end communicating with said first conduit downstream from said valve means for receiving water and any fluids introduced thereinto through said valve means, and an upwardly directed submersible distributor head connected to the other end of said distribution conduit means, said distributor head having a chamber therein, said chamber having an inlet and an outlet, said chamber inlet being at an elevation below the elevation of said chamber outlet and being connected to said distribution conduit means for receiving water and fluid introduced through said first conduit therein, said chamber outlet being substantially smaller in size as compared with said chamber inlet for permitting discharge of water and said fluid vertically upwardly from said distributor head.

2. Apparatus in accordance with claim 1 wherein said conduit means includes discrete distribution conduits each having one end communicating with said first conduit, a discrete submersible distributor head connected to the other end of each distribution conduit, each distribution conduit being longer than said first conduit.

3. Apparatus in accordance with claim 2 wherein said pump is a submersible pump having its inlet in direct communication with a body of water to be aerated.

4. Apparatus in accordance with claim 1 wherein said valve means includes a member having an upright leg and two diverging legs at the lower end of the upright leg, the upper end of said upright leg being connected to said first conduit, and discrete means connected to each leg for selectively introducing a fluid directly into each leg.

5. Apparatus in accordance with claim 4 including a dispensing container for dispensing a liquid, said container being connected to said upright leg for introducing a liquid at atmospheric pressure thereinto.

6. Apparatus in accordance with claim 1 wherein said structure for supporting said valve means includes vertically adjustable elements for changing the elevation of said valve means.

7. Apparatus in accordance with claim 1 wherein said distributor head is supported from below by a base adapted to rest on the bottom of a shallow body of water.

8. Apparatus in accordance with claim 1 wherein said distributor head, pump, and structure for supporting said valve means are each free from any means for anchoring the same so that the apparatus as an entity is portable for movement from one location to another.

9. Apparatus for aerating bodies of water comprising a submersible pump having an inlet and an outlet, said pump inlet being in direct communication with the body of water to be aerated, a first conduit having one end connected to said pump outlet, valve means coupled to the other end of said conduit to allow a fluid at atmospheric pressure to be introduced into said conduit, structure supporting said valve means and said other end of said first conduit on land at an elevation above water level with the other end of said first conduit being directed downwardly, distribution conduit means having a greater flow capacity than said first conduit, said distribution conduit means having one end communicating with said first conduit downstream from said valve means for receiving water and any fluids introduced thereinto through said valve means, and an upwardly directed submersible distributor head connected to the other end of said distribution conduit means, said distributor head having a chamber therein, said chamber having an inlet and an outlet, said chamber inlet being at an elevation below the elevation of said chamber outlet and being connected to said distribution conduit means for receiving water and any fluid therein solely from said distribution conduit means, said chamber outlet being substantially smaller in size as compared with said chamber inlet for permitting discharge of aerated water vertically outwardly from said distributor head, and said distributor head being supported from below by a base.

* * * * *